US009355668B2

(12) United States Patent
Nishida et al.

(10) Patent No.: US 9,355,668 B2
(45) Date of Patent: May 31, 2016

(54) HARD DISK DRIVE WITH CONTACT DETECTION USING A SPIN TORQUE OSCILLATOR

(71) Applicant: HGST Netherlands B.V., Amsterdam (NL)

(72) Inventors: Yasutaka Nishida, Fujisawa (JP); Masato Shiimoto, Odawara (JP); Hiroyuki Katada, Odawara (JP); Ikuya Tagawa, Hiratsuka (JP); Junguo Xu, Kasumigaura (JP)

(73) Assignee: HGST Netherlands B.V., Amsterdam (NL)

( * ) Notice: Subject to any disclaimer, the term of this patent is extended or adjusted under 35 U.S.C. 154(b) by 1 day.

(21) Appl. No.: 13/899,334

(22) Filed: May 21, 2013

(65) Prior Publication Data

US 2014/0347969 A1 Nov. 27, 2014

(51) Int. Cl.
*G11B 5/00* (2006.01)
*G11B 5/60* (2006.01)

(52) U.S. Cl.
CPC .................... *G11B 5/6076* (2013.01)

(58) Field of Classification Search
CPC .. G11B 5/1278; G11B 5/3133; G11B 5/3116; G11B 5/3136; G11B 5/6005; G11B 5/6076
USPC ............... 360/31, 75, 125.3, 125.31, 125.32, 360/125.71, 125.74, 125.75, 128, 234.4
See application file for complete search history.

(56) References Cited

U.S. PATENT DOCUMENTS

| 6,229,665 | B1 | 5/2001 | Carlson et al. |
| 6,700,724 | B2 | 3/2004 | Riddering et al. |
| 7,023,647 | B2 | 4/2006 | Bloodworth et al. |
| 7,317,590 | B2 | 1/2008 | Chan |
| 8,085,490 | B2 | 12/2011 | Franca-Neto et al. |
| 8,098,450 | B2 | 1/2012 | Baumgart et al. |
| 8,139,307 | B2 | 3/2012 | Kim et al. |
| 2008/0186621 | A1 | 8/2008 | Partee |
| 2009/0153995 | A1 | 6/2009 | Jang |
| 2010/0302690 | A1* | 12/2010 | Worledge .................. 360/324.11 |
| 2013/0050865 | A1* | 2/2013 | Katada et al. .................... 360/31 |
| 2013/0050867 | A1* | 2/2013 | Yamane et al. .................. 360/59 |

FOREIGN PATENT DOCUMENTS

EP  1526515 A2  4/2005

OTHER PUBLICATIONS

IEEE.org, "Integrated microheaters for in-situ flying-height control of sliders used in hard-disk drives", IEEEXplore Digital Library, URL: http://ieeexplore.ieee.org/xpl/login.jsp?tp=& arnumber=906512&url=ht . . . , Aug. 7, 2002, p. 1 of 1.
Schultz, Brian E, "Thermal Fly-height Control (TFC) Technology in Hitachi Hard Disk Drives", Hitachi Global Storage Technologies, published in the U.S. in Nov. 2007, 2 pages.
Suzuki, Kenji et al., A MEMS-Based Active-Head Slider for Flying Height Control in Magnet Recording, JSME International Journal, Series B, vol. 47, No. 3, 2004, pp. 453-458.

* cited by examiner

*Primary Examiner* — Gustavo Polo
(74) *Attorney, Agent, or Firm* — John D. Henkhaus

(57) ABSTRACT

A hard-disk drive having a structurally efficient magnetic head slider utilizes a MAMR-based spin torque oscillator (STO) for head-disk contact detection and for flying height sensing. Contact detection and spacing estimation techniques consider the nominal temperature difference, and thus different criteria, between read and write operations.

14 Claims, 5 Drawing Sheets

HARD DISK DRIVE WITH CONTACT DETECTION USING A SPIN TORQUE OSCILLATOR

FIELD OF THE INVENTION

Embodiments of the invention relate generally to magnetic recording and more particularly to slider flying height detection in a hard disk drive.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

Increasing areal density (a measure of the quantity of information bits that can be stored on a given area of disk surface) is one of the ever-present holy grails of hard disk drive design evolution, and has led to the necessary development and implementation of various means for reducing the spacing between the magnetic head and the magnetic-recording disk. Thus, modern head sliders are flying closer and closer to the disk and it is increasingly important to precisely detect the flying height.

In some instances, the mechanical vibration of the head slider is used to detect contact between the slider and the disk, because contact awareness is important to accurate flying height spacing. For more accurate contact detection, a dedicated contact sensor (also at times referred to as an "embedded contact sensor" or "ECS", and a "resistive temperature detector" or "RTD") has been proposed, which is configured into the head slider and whose temperature change is used as an indicator of contact and/or near contact. ECS elements sense physical contact of the slider with the disk based on the ECS element's resistance, e.g., the amount of voltage across the element, which is affected by the temperature change caused by such physical contact.

However, to monitor the resistance change in this manner it is necessary to apply current to the contact sensor. Consequently, an additional electrical line is needed on the suspension and an additional electrical connection pad is needed on the slider in order to utilize such a contact detection system. This results in a more complex and costly design in comparison with a magnetic head slider that does not comprise a contact detection system.

SUMMARY OF EMBODIMENTS OF THE INVENTION

Embodiments of the invention are directed to a structurally efficient magnetic head slider design that utilizes a MAMR-based spin torque oscillator (STO) for head-disk contact detection and flying height sensing.

An STO element has a large temperature change according to whether a read or write operation is being performed, unlike the resistive element used only for ECS. That is, because an STO element has a primary function of write assist, a relatively larger current is applied during the write operation than is required for resistance change monitoring for flying height sensing purposes. Further, during the read operation, a smaller current should be applied to the STO than for the write operation to avoid unexpected data erasure. Therefore, according to an embodiment, contact detection and spacing estimation techniques consider the nominal temperature difference, and thus different criteria, between the read and write operations.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to the use of a spin torque oscillator (STO) for head-disk contact detection and head slider flying height sensing, for example, for use in a hard disk drive (HDD). In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
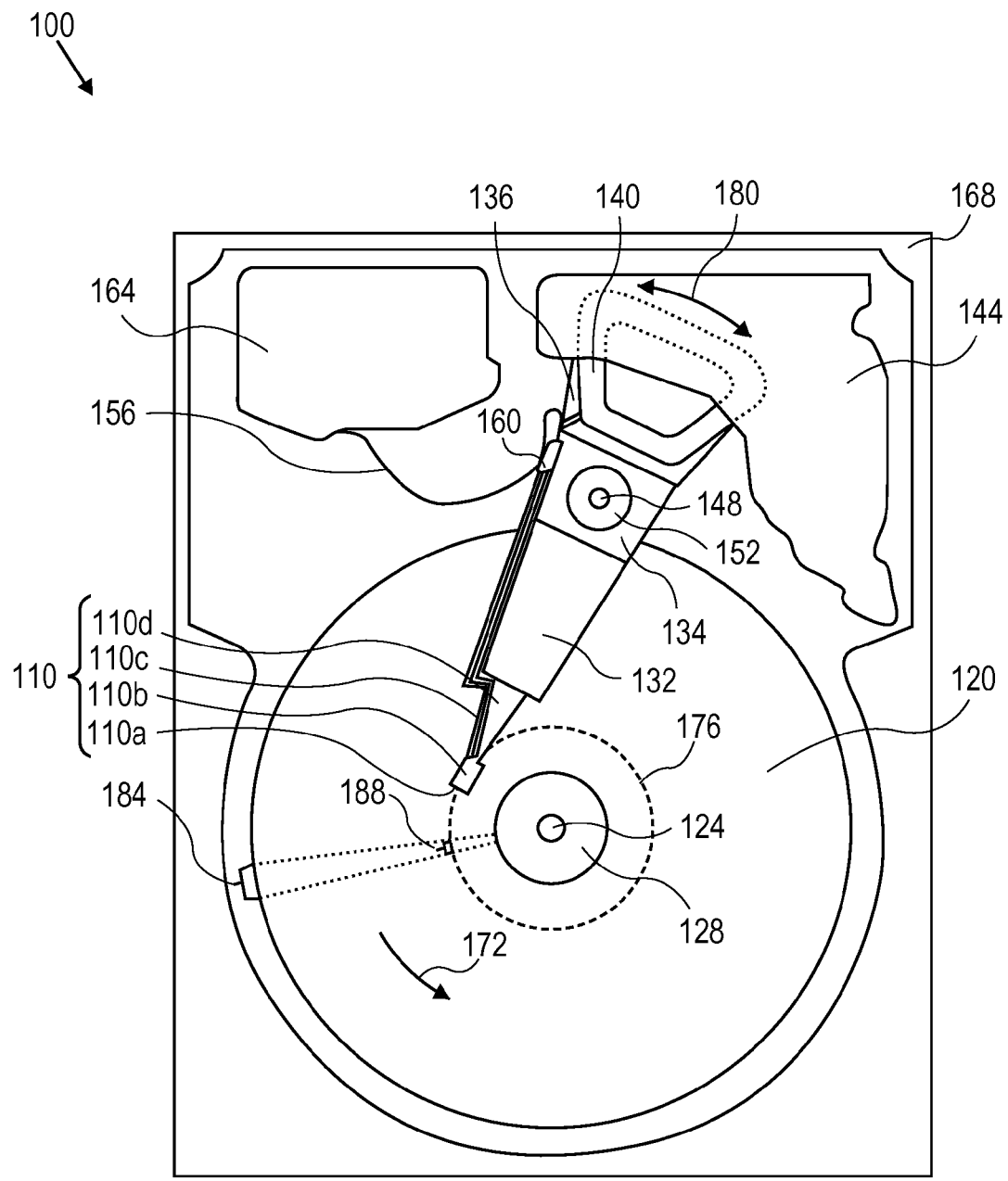
FIG. 1 is a plan view of an HDD, according to an embodiment of the invention.

Embodiments of the invention may be used in the context of the manufacturing and use of a magnetic read/write head for a hard-disk drive (HDD). In accordance with an embodiment of the invention, a plan view of a HDD 100 is shown in FIG. 1. FIG. 1 illustrates the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184.

Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
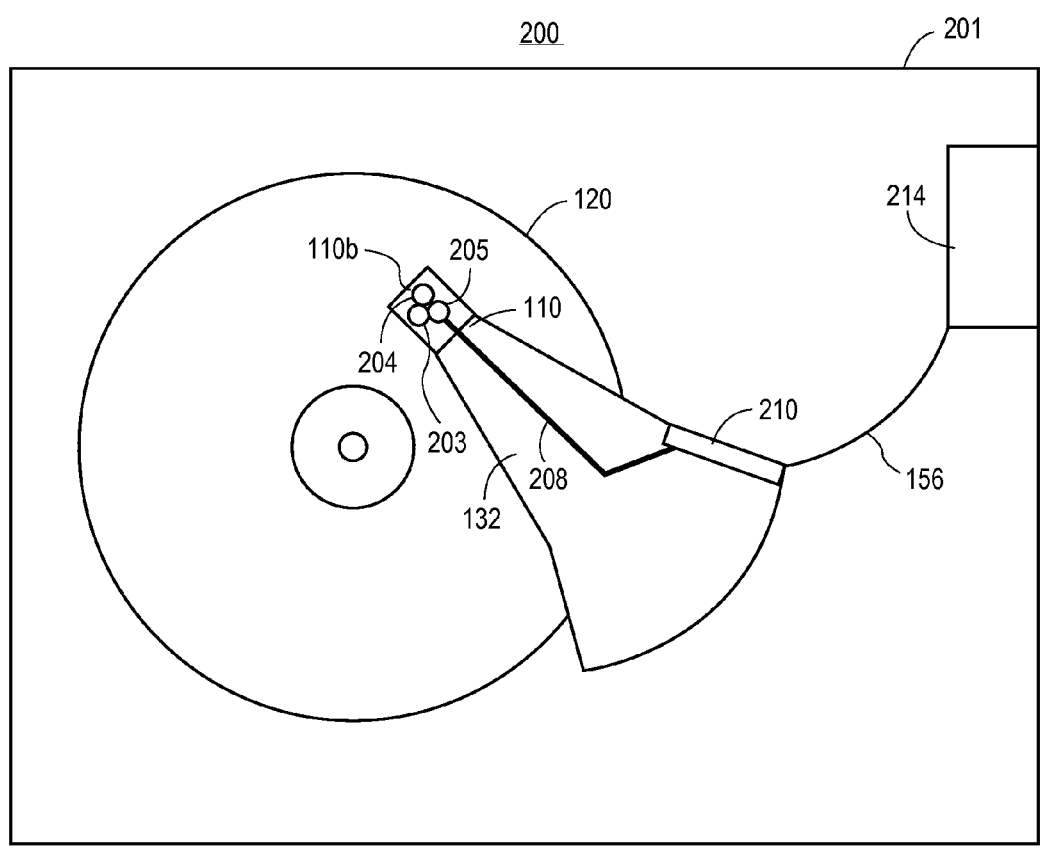
FIG. 2 is an illustration of an electrical circuit pathway within an HDD, according to an embodiment of the invention.

FIG. 2 is an illustration of an electrical circuit pathway within an HDD, according to an embodiment of the invention. FIG. 2 depicts hard-disk drive (HDD) 200 which includes enclosure 201 that contains one or more magnetic platters or disks 120, an embedded contact sensor (ECS) element 203, a read element 204, a write element 205, an actuator arm 132, an HGA 110, a transmission line interconnect 208, an integrated circuit (IC) 210 (such as AE 160), a flexible interconnect cable, and a disk enclosure connector 214.

Electrical signals are communicated between the read/write/ECS elements 203, 204, 205 and integrated circuit 210 over transmission line interconnect 208. Integrated circuit 210 conditions the electrical signals so that they can drive write element 205 during writing and amplifies the electrical signal from read element 204 during reading. Further, IC 210 handles signals to and from ECS 203, which can be utilized as head-disk spacing signals and other flying height signals associated with the control and management of the flying height, generally, and with the IVC system, specifically. Signals are communicated between IC 210 and disk enclosure connector 214 over flex cable 156. Disk enclosure connector 214 conducts signals with circuitry external to disk enclosure 201. In other embodiments, IC 210 is located elsewhere than where depicted in FIG. 2, such as on flex cable 156 or on a printed circuit board (PCB) within the hard-disk drive. IC 210 is at times also referred to as, or may contain, a preamplifier ("preamp").

Figure 3:
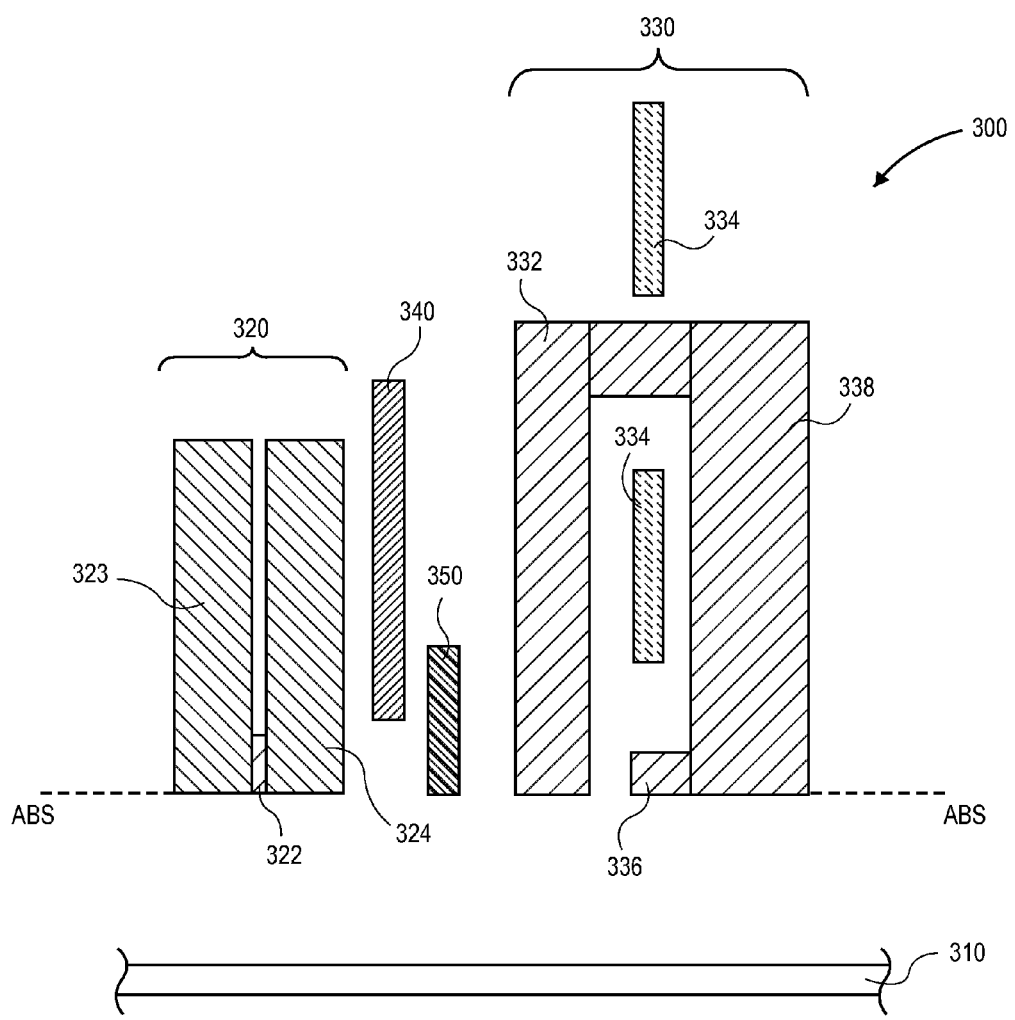
FIG. 3 is a block diagram illustrating a cross-sectional view of a conventional magnetic recording (MR) head having a dedicated contact sensor.

FIG. 3 is a block diagram illustrating a cross-sectional view of a conventional magnetic recording (MR) head having a dedicated contact sensor. FIG. 3 illustrates a MR head 300 in relation with a recording medium such as disk 310. MR head 300 comprises a reader 320 and a writer 330. Additionally, MR head 300 comprises a heater 340 and an embedded contact sensor (ECS) 350.

Reader 320 comprises a read sensor 322 located between two soft magnetic shields 323 and 324. Heater 340 is typically used for thermal flying height control (TFC). By applying current to the heater 340, the surrounding slider material is caused to expand in response to the heat, which causes a bulge in the slider toward the disk 310 thus reducing the flying height. Particularly during read operations, the heater causes the reader 320 to be closer to the disk 310 to increase the signal strength of the readback signal read from the magnetic disk 310.

ECS 350 is a metallic strip located at the slider ABS and typically in close proximity to the writer 330. The resistance of the ECS changes in response to temperature changes and can be used to detect disk-slider contact, when the slider temperature suddenly increases due to frictional heating with the disk 310.

Writer 330 comprises a main pole 332, a writer coil 334, a magnetic shield 336, and a return pole 338. Main pole 332 is exposed at the ABS (air bearing surface) and faces disk 310 and forms recording bits by reversing the magnetization of magnetic particles in the disk 310. Writer coil 334 is for exciting the main pole 332, i.e., the electricity flowing through the coil 334 produces a magnetic field that emits from the tip of main pole 332. A return pole 338 is positioned for providing means for the magnetic flux to return from disk 310 to the writer structure to complete the magnetic circuit. The magnetic shield 336 is positioned between the main pole 332 and the return pole 338 for assisting with focusing the magnetic flux emitting from main pole 332.

For writing, electrical pulses are sent to the coil 334 of writer 330 with different patterns of positive and negative currents and the current in the coil 334 induces a magnetic field across the gap between the main pole 332 and the disk 310, which in turn magnetizes a small area on the recording medium. A strong, highly concentrated magnetic field emits from the main pole 332 in a direction perpendicular to the disk surface, magnetizing a magnetically hard top layer of disk 310. The resulting magnetic flux then travels through a soft underlayer of disk 310, returning to the return pole 338 where it is sufficiently spread out and weak that it will not erase the signal recorded by the main pole 332 when it passes back through the magnetically hard top layer on its way back to the return pole 338.

Microwave-Assisted Magnetic Recording

"MAMR" refers to "microwave-assisted magnetic recording". Using MAMR, the head slider emits a microwave field that excites the electrons in the media, building up energy that eases and assists the process of writing data bits. The MAMR process is likely to use a localized high frequency magnetic field generated by a magnetic thin film stack integrated into the existing head sliders. One technique for implementing such a film stack utilizes a spin torque oscillator (STO). The STO element injects auxiliary magnetic flux to the write pole to facilitate the magnetization switching of the write pole, where electrical current to the STO induces rotation of the magnetization of a free ferromagnetic layer in the STO, which generates the auxiliary magnetic flux.

Using a Spin Torque Oscillator for Contact Detection

Even using MAMR, it is advantageous to narrow the head-disk spacing in order to improve the storage density of a hard disk drive (HDD). However, with an STO to assist writing in a MAMR head, the head structure and electrical circuitry becomes more complex. In addition, using a separate sensor for the exclusive use for contact detection and flying height sensing and control (e.g., an embedded contact sensor, or ECS) also increases the number of electrical connection pads. Thus, use of both STO and ECS structures in a magnetic head slider complicates the head slider structure, which also increases the cost. Furthermore, the typical position of the ECS is not coincident with that of the writer and, therefore, any protrusion near the writer due to the heat induced by the writing process lessens the accuracy of flying height sensing by the ECS.

Figure 4:
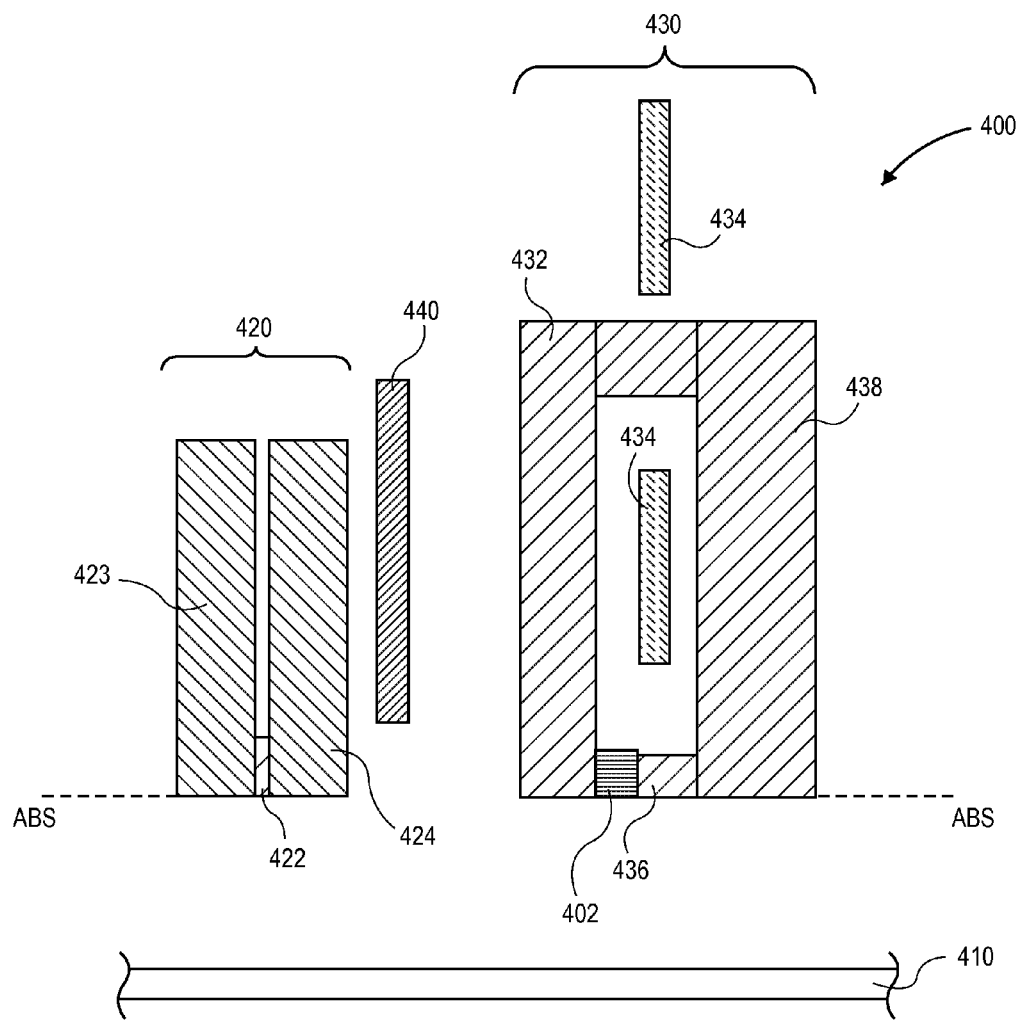
FIG. 4 is a block diagram illustrating a cross-sectional view of a microwave-assisted magnetic recording (MAMR) head, according to an embodiment of the invention.

FIG. 4 is a block diagram illustrating a cross-sectional view of a microwave-assisted magnetic recording (MAMR) head, according to an embodiment of the invention. MAMR head 400 of FIG. 4 is largely similar to MR head 300 of FIG. 3, except for the absence of an embedded contact sensor (such as ECS 350 of FIG. 3). Thus, MAMR head 400 comprises a reader 420, a writer 430, and an optional heater 440. The descriptions of the elements of MR head 300 of FIG. 3 apply to the similarly numbered elements of MAMR head 400 of FIG. 4 and are, therefore for conciseness, not repeated here.

In contrast to the MR head 300. MAMR head 400 includes a spin torque oscillator (STO) element 402. As previously discussed, for purposes of MAMR, an STO element such as STO element 402 injects auxiliary magnetic flux to the main pole 432 to facilitate the magnetization switching of the main pole 432.

According to embodiments, head and media contact detection and spacing estimation are performed based on the resistance change of STO element 402. STO element 402 has a large temperature change according to whether a read or write operation is being performed, unlike the resistive element used only for ECS. That is, because STO element 402 has a primary function of write assist, a relatively larger current is applied during the write operation than is required for resistance change monitoring for contact detection and flying height sensing purposes. Further, during the read operation, a smaller current should be applied to the STO element 402 than for the write operation to avoid unexpected data erasure. Therefore, according to an embodiment, contact detection and spacing estimation techniques consider the nominal temperature difference, and thus different criteria, between the read and write operations.

In comparison to the scenario in which both a dedicated contact sensor (e.g., ECS 350 of FIG. 3) and an STO element such as STO element 402 are used, with embodiments described herein the head structure and the associated electrical parts are simplified due to the simpler head structure itself and to the fewer electrical lines and pads. As a result, the cost of a magnetic recording system can be reduced.

As illustrated in FIG. 4, STO element 402 is located between the main pole 432 and the magnetic shield 436, which are significant components for the write operation. Thus, based on the location of STO element 402 within MAMR head 400, the head-disk spacing that is the most sensitive to writing performance can be detected or estimated directly rather than through extrapolation from a resistive element that is more remote from the writer 430, thereby enabling an increase in areal density.

Figure 5:
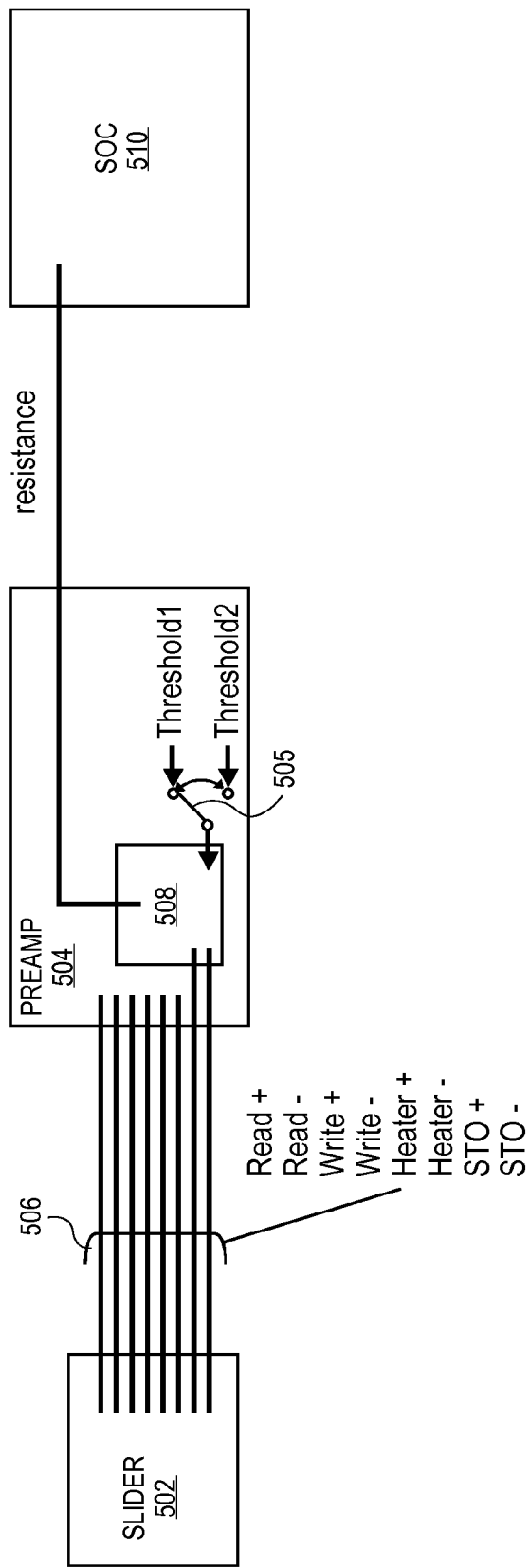
FIG. 5 is a block diagram illustrating use of a microwave-assisted magnetic recording (MAMR) head for flying height sensing, according to an embodiment of the invention.

FIG. 5 is a block diagram illustrating use of a microwave-assisted magnetic recording (MAMR) head for flying height sensing, according to an embodiment of the invention. FIG. 5 illustrates a magnetic head slider 502 (e.g., also refer to slider 110b of FIG. 1) electrically coupled to a preamp 504 (e.g., also refer to integrated circuit 210 of FIG. 2) via electrical lines 506 (e.g., also refer to transmission line interconnect 208 of FIG. 2).

Electrical pads on head slider 502 are connected to the preamp 504 via a flexible cable (carrying electrical lines 506) on a suspension (e.g., also refer to lead suspension 110c of FIG. 1). Preamp 504 has a function of applying current to read sensor 420, coil 434, heater 440 and STO element 402 (FIG. 4). Further, according to embodiments, a contact detection block 508 of preamp 504 has a function to measure the resistance of STO element 402 in real time, a function to detect a change of resistance in STO element 402, and a function to output contact detection results based on the change of resistance in STO element 402, according to some criteria. For example, the preamp 504 may determine that a contact event occurred based on a rapid rise in the resistance of the STO element 402.

In this embodiment, a head-disk contact event is determined by detecting a quick resistance change in STO element 402, based on at least two respective threshold values (depicted as Threshold1 and Threshold2 in FIG. 5A) corresponding to respective write gate 505 statuses which indicate whether the read/write head is operating in write mode or in read mode. As discussed, a larger current is applied to STO element 402 during the write operation than during resistance change monitoring for contact detection and flying height sensing purposes and, during the read operation an even smaller current should be applied to the STO element 402 than for the write operation. Therefore, according to an embodiment, the contact detection and spacing estimation techniques (which are based on the effect temperature has on the resistance of STO element 402) consider different threshold criteria, based on the nominal temperature differences corresponding to the nominal applied current differences used between the read and write operations.

According to another embodiment, the same design of magnetic head slider 502 is used as described in reference to FIG. 4. Preamp 504 has the same functions as with the previous embodiment, with an additional function to output the resistance change of the STO element 402 continuously on demand. A processor in SoC (system on chip) 510 can estimate a spacing change between the head and the disk based on the resistance change of STO element 402, which is received from the preamp 504. Because cooling of the slider due to heat dissipation to the disk depends on the head-disk interface (HDI) spacing, spacing changes between the slider and the disk lead to temperature changes in the STO element 402, which are discernible as fluctuations in the STO element 402 resistance. Based on changes of STO element 402 resistance, SoC 510 has a function which computes the corresponding change to the head-disk spacing. For example, the SoC 510 may determine that the head-disk spacing has changed based on a relatively small rise in the resistance of STO element 402, in comparison with the rapid rise in resistance which would more likely indicate a contact event.

To estimate head-disk spacing continuously, current applied to the STO element 402 ("STO current") is applied even during read operations, in contrast with the typical MAMR use in which STO current is only applied during write operations. The STO current applied during a read operation is sufficiently small to prevent unexpected data erasure, thus the STO current is different for read and write operations. Therefore the nominal STO temperature is different for each operation, and the temperature change due to spacing change is likewise different. To estimate spacing changes both during read and write operation consistently, different calculations for spacing estimation are performed for each respective operation.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
    a head slider comprising a read/write head comprising a spin torque oscillator (STO) element;
    a magnetic-recording disk rotatably mounted on a spindle;
    a voice coil motor configured to move the head slider to access portions of the magnetic-recording disk; and
    at least one an electronic component configured to:
        monitor the resistance of said STO element, and
        detect a contact event between said head slider and said magnetic-recording disk based on said resistance of said STO element and based on different respective criteria depending on whether a read operation is being performed or a write operation is being performed.

2. The hard-disk drive of claim 1, wherein said electronic component is a first electronic component and is further configured to output a resistance value of said STO element, said hard-disk drive further comprising:
    a second electronic component configured to:
        receive said resistance value output from said first electronic component, and
        estimate a non-zero spacing between said head slider and said magnetic-recording disk based on said resistance value.

3. The hard-disk drive of claim 2, wherein said second electronic component is further configured to estimate the non-zero spacing between said head slider and said magnetic-recording disk based on different criteria depending on whether a read operation is being performed or a write operation is being performed.

4. The hard-disk drive of claim 2,
    wherein said head slider further comprises an embedded contact sensor (ECS) element;
    wherein said first electronic component is further configured to monitor and output the resistance of said ECS element; and
    wherein said second electronic component is further configured to estimate the spacing between said head slider and said magnetic-recording disk based on said resistance of said STO element and said resistance of said ECS element.

5. The hard-disk drive of claim 1,
    wherein said electronic component is further configured to apply a first current to said STO element for detecting a contact event during a read operation and to apply a different second current to said STO element for detecting a contact event during a write operation.

6. The hard-disk drive of claim 1, wherein said STO element is positioned between a main write pole and a magnetic shield of said read/write head.

7. An electronic component configured for use in a hard-disk drive, said electronic component comprising a memory and a processor, the memory embodying one or more sequences of instructions which, when executed by the processor, cause performance of:
    monitoring the resistance of a spin torque oscillator (STO) element positioned in a read/write head of said hard-disk drive; and
    detecting a contact event between a head slider and a magnetic-recording disk based on said resistance of said STO element and based on different respective criteria depending on whether a read operation is being performed or a write operation is being performed.

8. The electronic component of claim 7, wherein said one or more sequences of instructions which, when executed, cause performance of applying a first current to said STO element for detecting a contact event during a read operation and applying a different second current to said STO element for detecting a contact event during a write operation.

9. An electronic component configured for use in a hard-disk drive, said electronic component comprising a memory and a processor, the memory embodying one or more sequence of instructions which, when executed by the processor, cause performance of:

receiving a resistance value output from an electronic component configured to monitor the resistance of a spin torque oscillator (STO) element positioned in a read/write head of said hard-disk drive, and estimating a non-zero spacing between a head slider and a magnetic-recording disk of said hard-disk drive based on said resistance value and based on different criteria depending on whether a read operation is being performed or a write operation is being performed.

10. A method for flying height sensing in a hard-disk drive comprising a head slider having an embedded spin torque oscillator (STO), the method comprising:

monitoring the resistance of said STO element; and detecting a contact event between said head slider and a magnetic-recording disk of said hard-disk drive based on said resistance of said STO element and based on different criteria depending on whether a read operation is being performed or a write operation is being performed.

11. The method of claim 10, further comprising:

estimating a non-zero spacing between said head slider and a magnetic-recording disk based on said resistance of said STO.

12. The method of claim 11, wherein said estimating further comprises estimating the non-zero spacing between said head slider and said magnetic-recording disk based on different criteria depending on whether a read operation is being performed or a write operation is being performed.

13. The hard disk drive of claim 1, wherein said different respective criteria are based on corresponding STO element nominal temperatures associated with a read operation and with a write operation, respectively.

14. The method of claim 11, wherein said estimating further comprises estimating the non-zero spacing based on spacing-based temperature changes in said STO element.

* * * * *